United States Patent
Elend (10) Patent No.: US 11,677,779 B2
(45) Date of Patent: Jun. 13, 2023

(54) SECURITY MODULE FOR A CAN NODE

(71) Applicant: NXP B.V., Eindhoven (NL)

(72) Inventor: Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 368 days.

(21) Appl. No.: 16/984,859

(22) Filed: Aug. 4, 2020

(65) Prior Publication Data

US 2021/0044615 A1  Feb. 11, 2021

(30) Foreign Application Priority Data

Aug. 6, 2019 (EP) ..................................... 19190363

(51) Int. Cl.
*H04L 29/06* (2006.01)
*G06F 11/10* (2006.01)
*H04L 12/40* (2006.01)
*H04L 29/08* (2006.01)
*H04B 1/38* (2015.01)
(Continued)

(52) U.S. Cl.
CPC ...... *H04L 63/1441* (2013.01); *G06F 11/1004* (2013.01); *H04B 1/38* (2013.01); *H04L 12/40013* (2013.01); *H04L 63/1416* (2013.01); *H04L 69/324* (2013.01); *H04L 2012/40215* (2013.01)

(58) Field of Classification Search
CPC ........... H04L 63/1441; H04L 12/40013; H04L 63/1416; H04L 69/324; H04L 2012/40215; G06F 11/1004; H04B 1/38
See application file for complete search history.

(56) References Cited

U.S. PATENT DOCUMENTS 9,380,070 B1  6/2016 Cain et al.
10,701,102 B2 *  6/2020 Zeng ..................... H04L 63/062
(Continued)

FOREIGN PATENT DOCUMENTS

EP  2 985 955 A1  2/2016
EP  3 148 154 A1  3/2017

OTHER PUBLICATIONS

Non-Final Rejection for U.S. Appl. No. 16/984,699, 14 pgs., (dated Sep. 15, 2021).
(Continued)

*Primary Examiner* — Kambiz Zand
*Assistant Examiner* — Afaq Ali (57) ABSTRACT

A security module for a CAN node includes a RXD input interface for receiving data from a CAN bus, TXD output interface for transmitting data to the CAN bus, and a RXD output interface for providing data to a local controller. The security module is configured to receive a CAN frame from the CAN bus. The CAN frame includes a CAN message. The security module is also configured to compare an identifier of the received CAN frame with at least one identifier associated with the local controller; and upon detection of a match between the identifier of the received CAN frame and the at least one identifier associated with the local controller: pass the CAN message to the local controller via the RXD output interface; decouple the local controller from the CAN bus; and invalidate the CAN message on the CAN bus via the TXD output interface.

20 Claims, 7 Drawing Sheets

(51) Int. Cl.
 *H04L 9/40* (2022.01)
 *H04L 69/324* (2022.01)

(56) References Cited

U.S. PATENT DOCUMENTS

| | | | | |
|---|---|---|---|---|
| 2014/0149801 | A1* | 5/2014 | Jiang | G06F 11/0739 |
| | | | | 714/43 |
| 2015/0095711 | A1* | 4/2015 | Elend | H04L 12/4135 |
| | | | | 714/39 |
| 2015/0135271 | A1 | 5/2015 | Forest | |
| 2015/0347218 | A1* | 12/2015 | Domingues | H04L 1/0082 |
| | | | | 714/48 |
| 2017/0093659 | A1* | 3/2017 | Elend | H04L 63/1416 |
| 2017/0235698 | A1* | 8/2017 | van der Maas | G06F 11/0784 |
| | | | | 710/106 |
| 2018/0060267 | A1* | 3/2018 | Sutton | H04L 67/12 |
| 2018/0152472 | A1 | 5/2018 | Amano et al. | |
| 2020/0150677 | A1* | 5/2020 | Walters | G05D 1/0206 |
| 2021/0044382 | A1 | 2/2021 | Elend | |
| 2021/0044600 | A1 | 2/2021 | Elend | |

OTHER PUBLICATIONS

Notice of Allowance dated Jun. 17, 2022 in U.S. Appl. No. 16/984,699.

"CAN with Flexible Data-Rate—Specification Version 1.0", Robert Bosch, retrieved from url:https://web.archive.org/web/20151211125031if_/http://www.bosch-semiconductors.de/media/ubk_semiconductors/pdf_1/canliterature/can_fd_spec.pdf, 34 pgs. (Apr. 17, 2012).

Matsumoto, T. et al. "A Method of Preventing Unauthorized Data Transmission in Controller Area Network", IEEE 75th Vehicular Technology Conference, 5 pgs., (2012).

Dagan, T. et al. "Parrot, a software-only anti-spoofing defense system of the CAN bus", retreived from the internet at url:https://www.eng.tau.ac.il/yash/Parrot-escar2016.pdf, 10 pgs. (Nov. 17, 2016).

* cited by examiner

Step 1

Step 2

SECURITY MODULE FOR A CAN NODE

CROSS-REFERENCE TO RELATED APPLICATIONS

This application claims the priority under 35 U.S.C. § 119 of European patent application No. 19190363.2, filed on Aug. 6, 2019, the contents of which are incorporated by reference herein.

FIELD

The present disclosure relates to security in controller area networks.

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol has also been extended to provide higher data rates. The extended protocol, referred to as CAN Flexible Data-Rate or "CAN FD," is part of the ISO 11898-1:2015 version of the standard. A next generation CAN protocol termed CAN XL is also under development.

One growing concern with in-vehicle networks, such as in-vehicle networks that use the CAN bus protocol, is network security, including intrusion detection and intrusion prevention. For example, a compromised in-vehicle network could allow an attacker to maliciously control components of a vehicle.

SUMMARY

According to a first aspect of the present disclosure there is provided a security module for a controller area network, CAN, node, the security module comprising:
  a receive data, RXD, input interface for receiving data from a CAN bus;
  a transmit data, TXD, output interface for transmitting data to the CAN bus; and
  a RXD output interface for providing data to a local controller;
  wherein the security module is configured to:
    receive a CAN frame from the CAN bus via the RXD input interface, wherein the CAN frame includes a CAN message;
    compare an identifier of the received CAN frame with at least one identifier associated with the local controller; and
    upon detection of a match between the identifier of the received CAN frame and the at least one identifier associated with the local controller:
      pass the received CAN message to the local controller via the RXD output interface;
      decouple the local controller from the CAN bus; and
      invalidate the CAN message on the CAN bus via the TXD output interface.

Such a security module can advantageously provide nodes on a CAN network with a means to identify that they are under attack, whilst still invalidating a spoofed CAN message on the CAN bus. This is achieved by decoupling the local controller that is associated with the spoofed message from the CAN bus, and also invalidating the CAN message on the CAN bus.

In one or more embodiments, the security module further comprises a TXD input interface for receiving data from the local controller. The security module may be further configured to decouple the local controller from the CAN bus by coupling the TXD input interface to the RXD output interface, optionally such that the local controller does not discard the CAN frame.

In one or more embodiments, the security module is configured to invalidate the CAN message on the CAN bus by setting a plurality of bits, after a cyclic redundancy check, CRC, bit of the CAN frame, to a dominant value.

In one or more embodiments, the security module is configured to decouple the local controller from the CAN bus and invalidate the CAN message on the CAN bus for bits of the CAN frame immediately following a cyclic redundancy check, CRC, bit of the CAN frame.

In one or more embodiments, the security module is configured to decouple the local controller from the CAN bus until it receives a recessive bit from the CAN bus via the RXD input interface.

In one or more embodiments, the security module is further configured to recouple the local controller to the CAN bus following receipt of a recessive bit from the CAN bus.

In one or more embodiments, the security module is configured to pass a portion of the CAN frame to the local controller. The portion may comprise bits of the CAN frame prior to and optionally including one or more acknowledge bits of the CAN frame.

In one or more embodiments, the security module is configured to provide the received CAN frame unmodified to the local controller via the RXD output interface.

There is also disclosed a CAN node comprising: a CAN transceiver; a local controller; and any security module disclosed herein. The RXD input interface and the TXD output interface of the security module may be configured to communicate with the CAN bus via the CAN transceiver. The security module may be configured to communicate with the local controller via the RXD output interface and the TXD input interface.

In one or more embodiments, the local controller is configured to determine that the received CAN frame is a malicious frame.

In one or more embodiments, the local controller is configured to determine that the received CAN frame is a malicious frame by comparing the identifier of the received CAN frame with the at least one identifier associated with a local controller.

In one or more embodiments, the local controller is configured to output a dominant acknowledge bit followed by recessive bits upon receipt of the received CAN frame.

In one or more embodiments, upon determination that the received frame is a malicious frame, the local controller is configured to do one or more of:
  log the CAN frame as a malicious frame;
  alert or display an error to a network operator that the CAN node and/or the CAN network are under attack;
  put the CAN node into an emergency mode or shut down the CAN node;

put one or more other CAN nodes on the CAN bus and/or the CAN network into an emergency mode; and send a message to other CAN nodes on the CAN bus indicating that the CAN network is under attack.

In one or more embodiments, the security module or the CAN node is for use in a Classical CAN, CAN FD or CAN XL network.

According to a further aspect of the invention, there is provided a method for invalidating a CAN message on a CAN bus, the method comprising:

receiving a CAN frame from the CAN bus, wherein the CAN frame includes the CAN message;

comparing an identifier of the received CAN frame with at least one identifier associated with a local controller;

detecting a match between the identifier of the received CAN frame and the at least one identifier associated with the local controller;

passing the received CAN message to the local controller;

decoupling the local controller from the CAN bus; and invalidating the CAN message on the CAN bus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
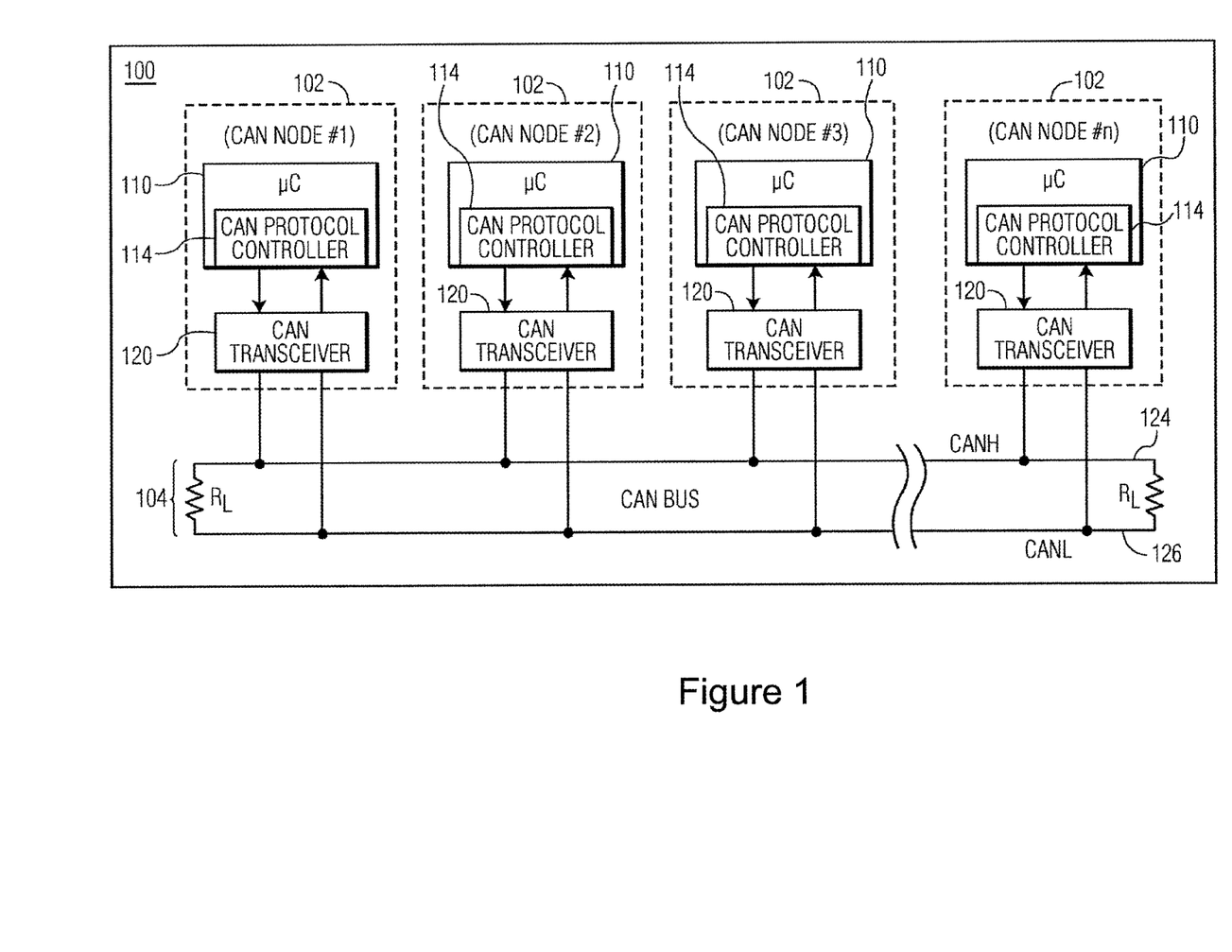
FIG. 1 shows a CAN network.

FIG. 1 depicts a CAN network 100 that includes multiple CAN nodes 102, also referred to as ECUs, each connected to a CAN bus 104. In the embodiment of FIG. 1, each CAN node 102 includes a CAN transceiver 120 and a local controller 110, or microcontroller, having an embedded CAN protocol controller 114. The local controllers 110 are typically connected to at least one device (not shown) such as a sensor, an actuator, or some other control device and are programmed to determine the meaning of received messages and to generate appropriate outgoing messages. The local controllers may also be referred to as host processors, hosts, or digital signal processors (DSPs). In some examples, the host supports application software that interacts with the CAN protocol controller 114.

The CAN protocol controllers 114, which can be embedded within the local controllers 110 or external to the local controllers (e.g., a separate IC device), implement data link layer operations. For example, in receive operations, a CAN protocol controller 114 stores received serial bits from the transceiver 120 until an entire message is available for fetching by the local controller 110. The CAN protocol controller 114 can also decode CAN messages according to the standardized frame formats of the CAN protocol. In transmit operations, the CAN protocol controller 114 receives messages from the local controller and transmits the messages as serial bits in one of the CAN frame formats to the CAN transceiver 120.

The CAN transceivers 120 are located between the CAN protocol controllers 114 and the CAN bus 104 and implement physical layer operations. For example, in receive operations, a CAN transceiver 120 converts analog differential signals from the CAN bus to serial digital signals that the CAN protocol controller 114 can interpret. The CAN transceiver also protects the CAN protocol controller 114 from extreme electrical conditions on the CAN bus 104, e.g., electrical surges. In transmit operations, the CAN transceiver 120 converts serial digital bits received from the CAN protocol controller 114 into analog differential signals that are sent on the CAN bus 104.

The CAN bus 104 carries analog differential signals and includes a CAN high (CANH) bus line 124 and a CAN low (CANL) bus line 126.

Figure 2:
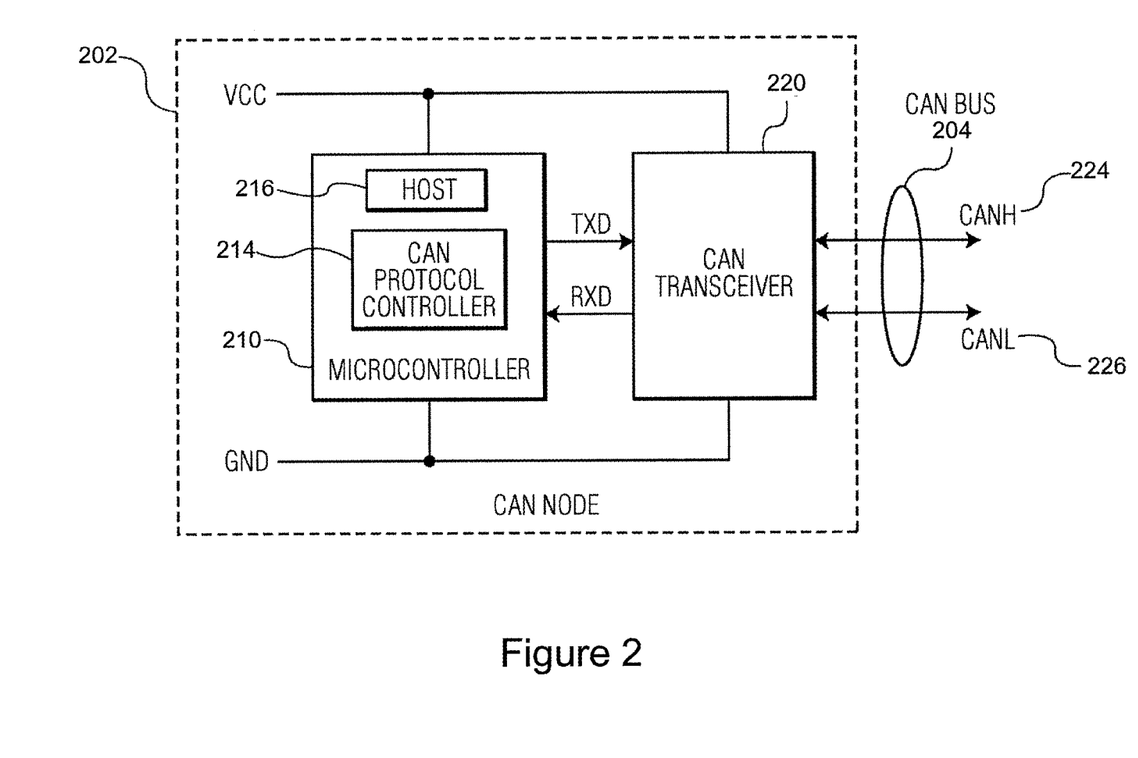
FIG. 2 shows an expanded view of a CAN node.

FIG. 2 depicts an expanded view of one CAN node 202. Features of FIG. 2 that are also shown in FIG. 1 have been given corresponding reference numbers in the 200 series and will not necessarily be described again here.

The local controller 210 includes a CAN protocol controller 214 and a host 216, which may be, for example, a software application that is stored in memory of the local controller 210 and executed by processing circuits of the local controller 210. The local controller 210 and the CAN transceiver 220 of the CAN node 202 are connected between a supply voltage, Vcc, and ground, GND. In some examples, the local controller 210 and the CAN transceiver 220 may have different supply voltages. As illustrated in FIG. 2, data communicated from the local controller 210 to the CAN transceiver 220 is identified as transmit data (TXD) and data communicated from the CAN transceiver 220 to the local controller 210 is referred to as receive data (RXD). Data is communicated to and from the CAN bus 204 via the CANH and CANL bus lines 224 and 226, respectively.

Figure 3:
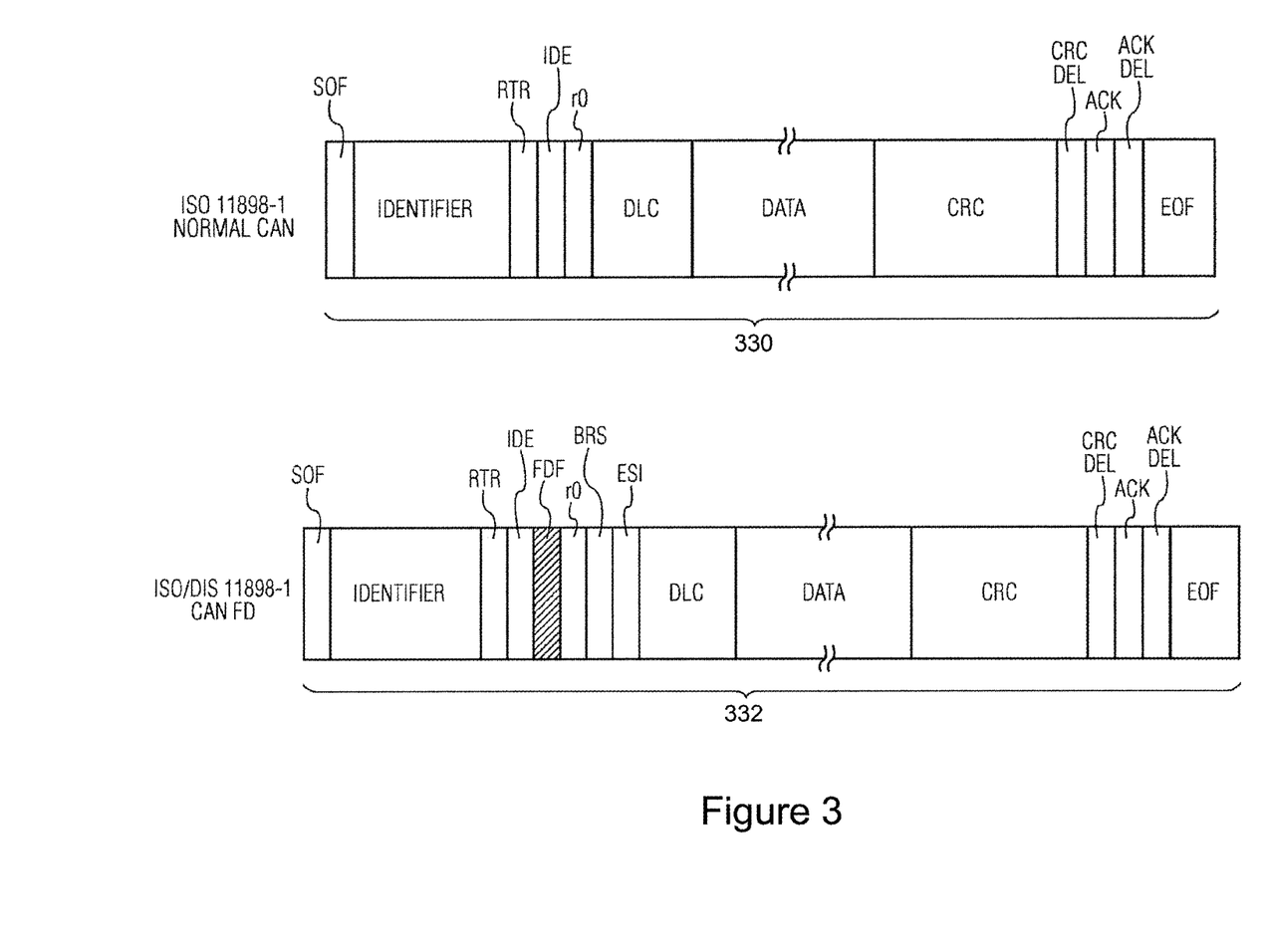
FIG. 3 shows a Classical CAN frame and a CAN FD frame in base frame format.

FIG. 3 depicts the format of a Classical CAN frame 330 (in the classical base frame format (CBFF) or standard format) that is used in CAN normal mode and also the format of a CAN FD frame 332 (in the FD base frame format or FBFF) that is used in CAN FD mode. The fields of the CAN normal mode and CAN FD mode frames are defined as follows:

SOF: Start of Frame (always dominant)

IDENTIFIER: Identifier Bits, defining the message content

RTR: Remote transmission Request

IDE: ID Extension r0: Reserved Bit 0 (replaced by FDF in the CAN FD format)
FDF: FD Format (this is the bit distinguishing the frame formats)
BRS: Baud Rate Switch
ESI: Error State Indicator
DLC: Data Length Code
Data: Data Bytes
CRC: Cyclic Redundancy Check
CRC Del: CRC Delimiter (always recessive)
ACK: Acknowledge
ACK Del: Acknowledge Delimiter
EOF: End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame or a CAN FD mode frame. When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The 29-bit IDENTIFIER field is divided into two sections, an 11-bit base IDENTIFIER field and an 18-bit extended IDENTIFIER field.

As stated above, security is a growing concern with in-vehicle networks. Many of the components of an in-vehicle network utilize software that must periodically be updated. In order to update software, in-vehicle networks often have "back door" access ports. If a back door access port is hacked, elements in the in-vehicle network can be compromised. One attack technique on an in-vehicle network that uses the CAN protocol involves an attacker sending error flags to disturb frames that start with a certain identifier, which may cause the legitimate sending CAN node of this certain identifier to go into a "bus off" state. While the legitimate CAN node is recovering from the bus off state, the attacker can send CAN messages (e.g., "data frames", which are CAN frames with the RTR bit set to "0") with the identifier that is normally used by the sending CAN node. The suspicious CAN messages may be received by CAN nodes on the CAN bus and recognized as valid messages because the identifier has previously been used within the CAN network. Thus there are spoofed messages on the CAN bus. Once received by a CAN node on the CAN bus, the suspicious messages can be used to implement malicious activity within the receiving CAN node.

To detect and prevent such an attack on the CAN network a CAN node can be configured to store the identifier of a CAN message that is being sent by the CAN node itself and further configured to compare the identifiers of incoming CAN messages to the stored identifier to determine if any incoming CAN messages have a matching identifier. Since identifiers are typically uniquely assigned to each CAN node, if a received identifier matches a stored identifier, the receiving CAN node can assume that the CAN message is from an intruder and can take an action to prevent the intrusion. For example, in response to detecting a match between a received identifier and a stored identifier, the CAN node can be configured to immediately send an error signal such as an error flag onto the CAN bus to prevent the malicious CAN message from being successfully and completely received by any CAN nodes on the CAN bus, e.g., to invalidate, destroy, and/or kill the CAN message. By applying such a technique, only the original (or legitimate) CAN node that uses a particular identifier can send CAN messages with that identifier without the CAN messages being invalidated, destroyed, and/or killed.

Figure 4A:
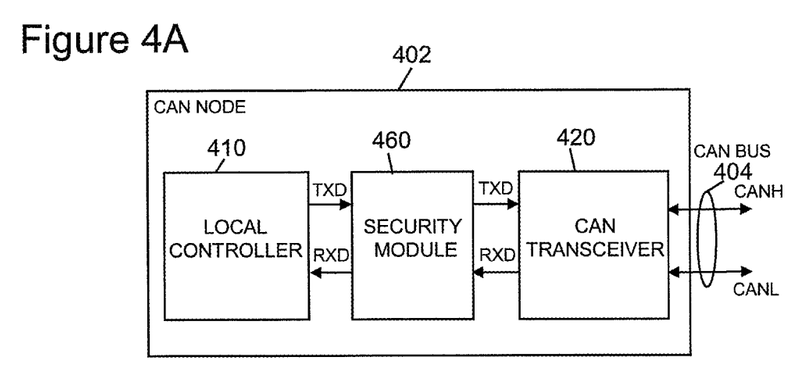
FIG. 4A shows a CAN node including a security module according to an embodiment of the disclosure.

FIG. 4A depicts a CAN node 402 including a security module 460 according to an embodiment of the present disclosure. In this embodiment, the security module 460 is provided separately to a CAN transceiver 420 and a CAN local controller 410. The security module 460 is located in a data path between the CAN transceiver 420 and the CAN local controller 410.

Figure 4B:
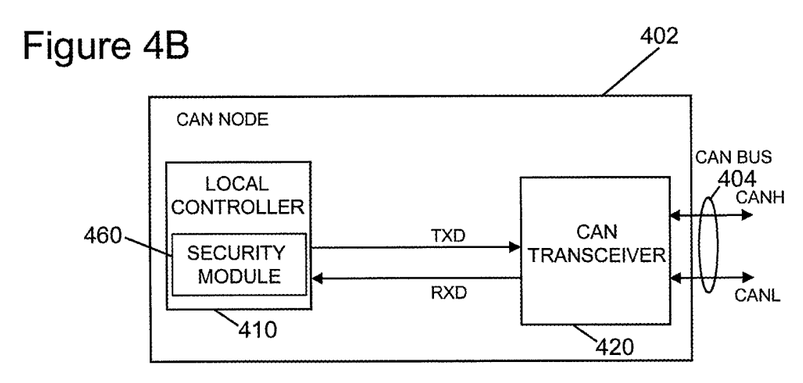
FIG. 4B shows a CAN node including another security module according to an embodiment of the disclosure.

FIG. 4B depicts a CAN node 402 including a security module 460 according to another embodiment of the present disclosure. In this embodiment, the security module 460 is provided as part of the CAN local controller 410. For instance, the functionality of the security module 460 can be provided by a CAN protocol controller.

In a further still embodiment, the functionality of the security module 460 can be provided by the CAN transceiver 420.

The security module 460 is configured to implement the above-described intrusion detection/prevention technique in a way that enables the CAN node 402 to examine any malicious CAN messages and/or take appropriate remedial action. It will be appreciated that examples disclosed herein can relate to a Classical CAN node, a CAN FD node, a CAN XL node, or any other CAN node that satisfies an associated CAN standard, either now or in the future.

The CAN node 402 includes a CAN transceiver 420 and a CAN local controller 410 as described above with reference to FIGS. 1 and 2.

The security module 460 is configured to decode an identifier of a CAN message (or CAN frame) that is received on the CAN bus 404 (e.g., CAN messages on the RXD path) and to compare the identifier of the CAN message to a local identifier associated with the CAN node 402. The local controller 410 may include a memory for storing one or more local identifiers associated with the local controller 410 or CAN node 402. The security module 460 is located before the CAN local controller 410 such that the comparison can take place before the CAN message is completely received at the CAN local controller 410. If the CAN message identifier matches the local identifier, the CAN node 402 is considered a CAN node under attack. If the comparison indicates that the identifier from the CAN message matches the local identifier (and assuming the CAN node 402 is not transmitting the CAN message itself) the security module 460 can: provide the received CAN message to the local controller 410; decouple the local controller 410 from the CAN bus 404; and invalidate the received CAN message on the CAN bus 404 which can destroy, and/or kill the CAN message on the rest of the CAN network.

The security module 460 may invalidate the received CAN message by setting a plurality of dominant bits in an end of frame field of the CAN message. The CAN message is invalidated and discarded without being processed at all CAN nodes that receive the invalidated CAN message from the CAN bus 404. This can prevent the CAN message from implementing any malicious activity within other CAN nodes in the CAN network.

By providing the received message to the local controller 410 and decoupling the local controller 410 from the CAN bus 404, prior to invalidating the CAN message on the CAN bus 410, the local controller 410 of the CAN node 402 under attack can: (i) determine that it is the CAN node under attack; (ii) process the received CAN message; and (iii) potentially take any remedial action. If the security module 460 did not decouple the local controller 410 from the CAN bus 404, the CAN node 402 under attack would discard the message without processing the message or examining its payload in the same way as the other CAN nodes connected to the CAN bus. As a result, none of the CAN nodes nor the CAN network could: (i) distinguish between an attack/security breech and an error arising from a non-security issue such as noise interference; (ii) examine the CAN message to gain insight or intelligence into the nature of the attack; or (iii) take remedial action to protect the CAN network from the attack or further attacks.

Figure 5:
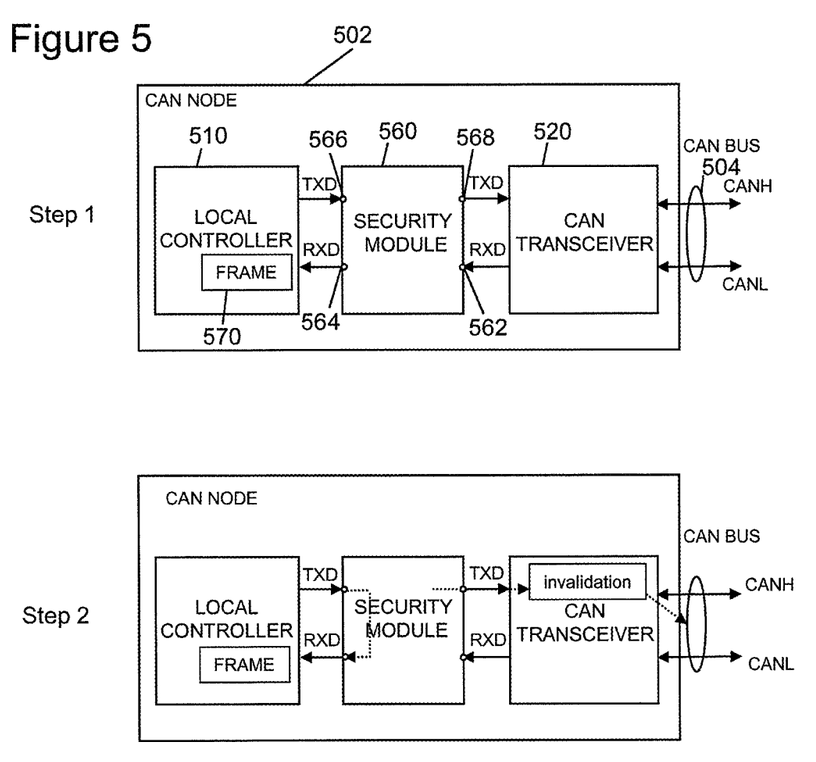
FIG. 5 illustrates the response of the CAN node of FIG. 4 following determination that the CAN node is under attack.

FIG. 5 illustrates the response of the security module 560 to determining the CAN node 502 is under attack following a comparison match between a CAN message identifier and a local identifier. Features of FIG. 5 that are also shown in FIG. 4 have been given corresponding reference numbers in the 500 series and will not necessarily be described again here.

The security module 560 comprises: a receive data, RXD, input interface 562 configured to receive data from the CAN bus 504 via the CAN transceiver 520; a RXD output interface 564 configured to pass through data (received from the CAN bus 504) to the local controller 510; a transmit data, TXD, input interface 566 configured to receive data (for onward transmission to the CAN bus 510) from the local controller 510; and a TXD output interface 568 configured to transmit data to the CAN bus 504. In this way, the security module 560 sits on the TXD and RXD paths between the CAN transceiver 520 and the local controller 510. When the security module 560 passes through data, it can preferably do so with no/minimal latency added, and without any kind of buffering.

Upon detection of the match in identifiers, in a first step, the security module 560 passes the received CAN message 570 (the rogue message or malicious message or spoof message) to the local controller 510. This can involve validly passing the CAN message to the local controller 510—that is, without invalidating the message by setting a plurality of bits, after a cyclic redundancy check, CRC, bit of the CAN frame, to a dominant value. Optionally, the security module 560 passes a portion of the CAN message 570 that includes the data payload to the local controller 510. The security module 560 may provide a portion of the CAN message that includes all bits prior to and optionally including an ACK bit and/or ACK Del bits of the CAN message 570.

In a second step, following provision of at least part of the CAN message 570 to the local controller 510, the security module 560 decouples the local controller 510 from the CAN bus 504. In some examples, the security module 560 decouples the local controller 510 from the CAN bus 504 by connecting the TXD input interface 566 to the RXD output interface 564. In this way, the local controller 510 can send a dominant ACK bit and recessive end of frame field bits upon receipt of the CAN message, indicating no error in the received CAN message. The local controller 510 will then receive back its own sent bits via the RXD output interface 564. The local controller 510 will interpret these error free bits to mean that no error flags have been raised by other nodes on the CAN network. In this way, the local controller 510 is isolated from the CAN bus 504 allowing it to process the malicious CAN message 570. As discussed below, this can enable the CAN node to determine that a spoof attack is being attempted.

Also during the second step, the security module 560 invalidates the CAN message on the CAN bus 504 via the TXD output interface 568 and the CAN transceiver 520. In this way, the security module 560 invalidates the CAN message for all nodes connected to the CAN bus 504. The security module 560 may invalidate the CAN message at the same time as or following connection of the TXD input interface 566 to the RXD output interface 564. As a result, the CAN bus 504 does not indicate the CAN message is invalid before the local controller 510 has been decoupled from the CAN bus 504.

The security module 560 may invalidate the CAN message by setting a single or a plurality of bits to a dominant value in any way that is known in the art. The plurality of bits may be a plurality of six consecutive bits in accordance with ISO 11898-1. The security module 560 may flag a plurality of bits after a CRC bit of the CAN message. The plurality of dominant bits may comprise a plurality of dominant bits in the end of frame field of the CAN message and one or more bits in the ACK and/or ACK del fields. The plurality of dominant bits may begin immediately after the CRC bit, or may be delayed after the CRC bit. For example, the plurality of dominant bits may begin 5 bits after the CRC bit. The plurality of dominant bits may begin at any bit position after the CRC bit position that is soon enough such that the plurality of dominant bits can be identified as a request to invalidate the CAN message.

By implementing steps 1 and 2 of FIG. 5, the security module 560 enables the CAN node 502 under attack (the legitimate sender of the CAN ID under attack) to receive the malicious CAN message 570 sent by the non-legitimate sender, while all other nodes on the CAN bus 504 will discard the spoofed CAN message. This allows the CAN node 502 under attack to log the attack and take other remedial steps.

The security module 560 can maintain the decoupling of the local controller 510 from the CAN bus 504 until the data received from the CAN bus 504 indicates error free operation. In some examples the security module 560 couples the local controller 510 to the CAN bus 504 again in response to the security module 560 receiving a recessive bit from the CAN bus via the RXD input interface 562.

Figure 6:
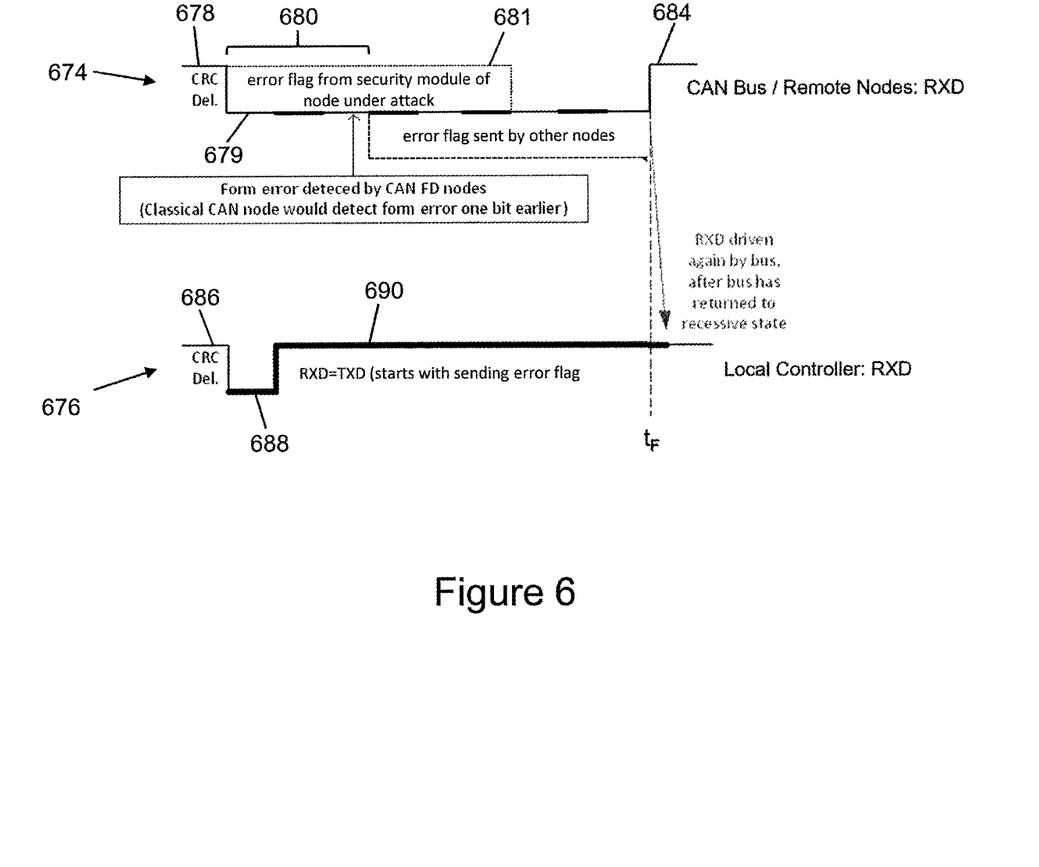
FIG. 6 illustrates a malicious CAN message at a bit level as seen by the CAN bus and nodes connected to the CAN bus.

FIG. 6 illustrates an example of a malicious CAN message at a bit level as seen by the local controller of the node under attack and as seen by the CAN bus and other remote CAN nodes following an identifier match by the security module, according to an embodiment of the present disclosure.

The upper portion of FIG. 6 illustrates an end portion 674 of the malicious CAN message as seen by the CAN bus and other remote nodes connected to the CAN bus. The first illustrated bit is a recessive CRC Del bit 678. The security module invalidates the CAN message on the CAN bus by setting a plurality of consecutive bits following the CRC Del bit 678 to a dominant value. In this example, the security module sets a multi-bit security error flag 681 beginning with the ACK bit 679 immediately following the CRC Del bit 678.

Remote nodes connected to the CAN bus will interpret a dominant ACK bit 679 as normal operation. Furthermore, there may be a tolerance 680 in the timing of the ACK bit 678 and the ACK Del bit such that the remote nodes will not determine there is an error until they receive two (Classical CAN) or three (CAN FD) consecutive dominant bits, indicating a dominant ACK Del bit. The tolerance allows for a transmission time of the ACK bit 678 and synchronisation offsets between the various nodes. After receiving more than two or three consecutive dominant bits, the remote nodes on the CAN bus determine that a form error is present and output their own error flags 682 onto the bus. In Classical CAN and CAN FD this form error flag 682 comprises setting 6 consecutive dominant bits in the CAN message.

Following the error flags, bits on the CAN bus return to the recessive state 684 at a time $t_F$. In other examples, this return to a recessive state may occur at a later time The lower portion of FIG. 6 illustrates an end portion of the CAN message 676 as received by the local controller of the CAN node under attack. A dominant ACK bit 688, indicating acknowledgment of the CAN message, follows a recessive CRC Del bit 686. The dominant bit may be set by the security module or the local controller of the CAN node under attack. In this example, the local controller is decoupled from the CAN bus immediately prior to the ACK bit 688. In other examples the local controller may be decoupled from the CAN bus at a later time as long as the local controller is decoupled from the CAN bus before the CAN bus indicates the CAN message is invalid.

In this example, the local controller of the node under attack is decoupled from the CAN bus by connecting the TXD input interface to the RXD output interface. In this example, the two interfaces are coupled to each other concurrently with the setting of the dominant ACK bit as the first bit of the security error flag 681. With the TXD input interface coupled to the RXD output interface, the local controller sends and receives back a consecutive stream of recessive bits 690. This is because following receipt of the dominant ACK bit 688, the local controller sends a plurality of recessive bits to the security module via the TXD input interface as it is not aware of any errors. By connecting the TXD input interface to the RXD output interface, the security module loops the recessive bits straight back to the local controller. The local controller interprets this recessive bit as an error-free indication coming from the CAN bus. Therefore, the local controller continues to provide and receive back recessive bits to and from the security module and consequently receives the consecutive stream of recessive bits. In this way, the local controller is "fooled" into determining an error free CAN bus.

The security module keeps the local controller decoupled from the CAN bus until the end of the security error flag 681 and until it receives a recessive bit from the CAN bus. In the figure, this is observed after the security error flag 681 at a time $t_F$ 692. In other examples, the CAN bus may not provide a recessive bit until a later time, for example if other nodes determine further errors. The security module recouples the local controller to the CAN bus following receipt of a recessive bit from the CAN bus. In this way, the RXD path of the local controller associated with the spoofed message is driven by the CAN bus again after the CAN bus has returned to a recessive state.

After receipt of the malicious CAN message and during the time of decoupling, the local controller can start to process the malicious CAN message. To process the malicious message, the local controller may first determine that the received CAN message is a malicious message. The local controller may determine that the message is malicious in the same manner as the security module, that is by comparing an identifier of the received CAN message to an identifier associated with the local controller or associated CAN node under attack. Additionally or alternatively, the local controller may compare the message to messages that the local controller has sent previously. In other examples, the local controller may receive an indication from the security module that the CAN message is a spoofed CAN message.

Upon determination that the received CAN message is a malicious CAN message, the local controller may perform one or more of a number of operations:

1. The local controller may log the CAN message as a malicious message. The logged message may be accessed by the CAN node or a network operator for future analysis.
2. The local controller may alert or display an error to a network operator that the associated CAN node and/or the CAN network is under attack. This may occur immediately following identification of a malicious message or following recoupling of the local controller to the CAN bus. The network operator may take appropriate remedial action such as shutting down the CAN network, enabling a safety mode of one or more nodes in the network and/or identifying and isolating the source of the attack.
3. The local controller may automatically put the CAN node under attack into an emergency mode or safe mode. This may include disabling, limiting or denying access to certain features.
4. The local controller may automatically send a message to one or more other CAN nodes or the whole CAN network via an emergency transmission path separate to the CAN bus. The message may alert the CAN nodes or network to the attack and/or put one or more CAN nodes into an emergency mode.
5. Following recoupling to the CAN bus, the local controller may automatically send a message to other nodes on the CAN bus indicating that the network is under attack. The message may alert the CAN nodes or network to the attack and/or put one or more CAN nodes into an emergency mode. The other nodes may enable a safety mode that disables, limits or denies access to certain features.

The functionality of the disclosed security module advantageously provides a CAN network owner with a means to identify CAN nodes under attack. This is achieved by masking of the error signal in the receive path of the CAN node which is under attack.

In the absence of decoupling of the local controller, when the security module issues an error signal to invalidate the CAN message, it would be invalidated and none of the connected CAN nodes would determine which CAN ID had been spoofed. Decoupling the local controller after it has received the spoofed message allows the CAN node under attack (the legitimate sender of the spoofed CAN ID), whose security module prevents the attack, to know that one of its CAN IDs is under attack.

In some examples, the security module issues an error signal (error flag) to invalidate the CAN message after the CRC Del bit and concurrently disconnects the RXD output interface from the CAN bus. The RXD output mirrors the TXD input until it becomes reconnected to the CAN bus, when the CAN bus returns to a recessive state. The local controller of the CAN node under attack sees a properly acknowledged CAN message, while the remote nodes on the CAN bus see a form error according to ISO11898-1 and thus discard the CAN message. In other words, the legitimate sender of the CAN ID under attack is able to receive the CAN message sent by the non-legitimate sender, while all other receivers on the bus will discard the spoofed message. This allows the legitimate sender to log the attack and take further remedial steps.

Figure 7:
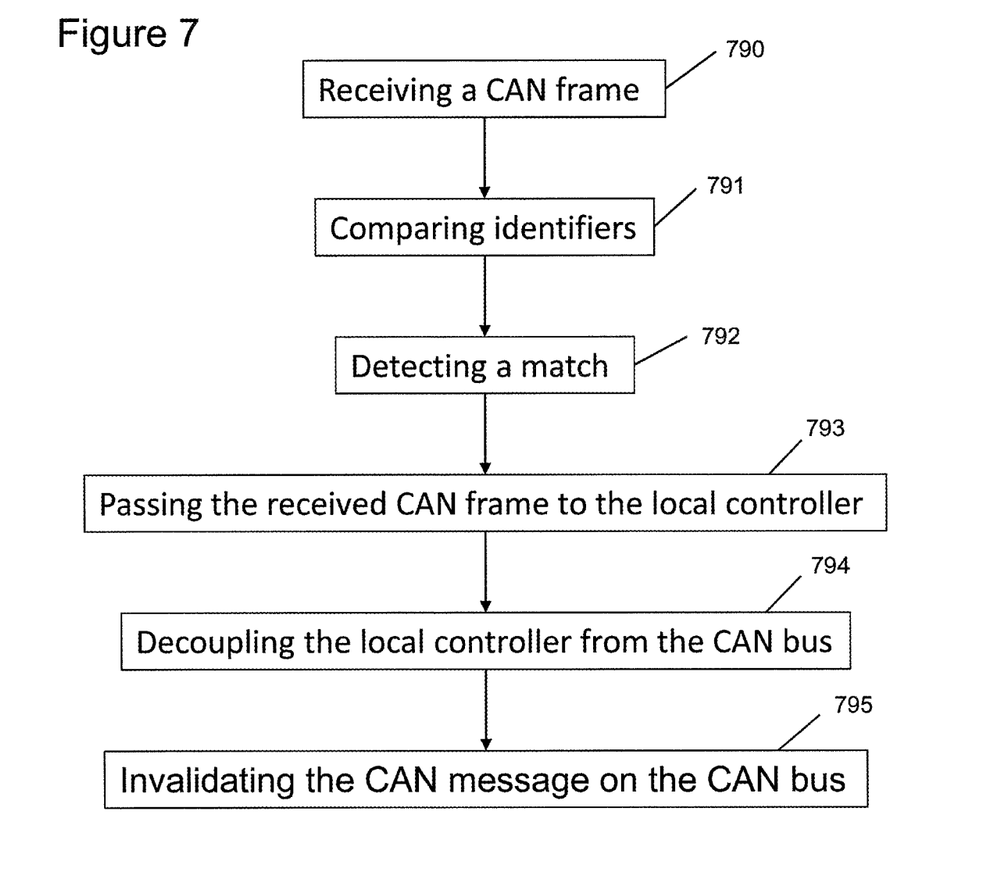
FIG. 7 illustrates an example embodiment of a method for invalidating a CAN message on a CAN bus.

FIG. 7 illustrates an example embodiment of a method for invalidating a CAN message on a CAN bus.

At step 790, the method includes receiving a CAN frame from the CAN bus. As discussed above, the CAN frame includes the CAN message. The method can involve determining whether or not the received message was sent from the local host or not. If the message was sent by the local host/node, then it may apply different or additional conditions than would be the case if the message had been received by a remote host/node. For instance, one or more policies may only be checked to see if they have been violated for a remotely received message that has the identifier of the local host/node.

At step 791, the method comprises comparing an identifier of the received CAN frame with at least one identifier associated with a local controller. The at least one identifier associated with a local controller can be stored in memory, and optionally can be received by a security module that performs this method.

At step 792, the method involves detecting a match between the identifier of the received CAN frame and the at least one identifier associated with the local controller. In response to detecting the match at step 792, the method performs each of steps 793, 794 and 795.

At step 793, the method includes passing the received CAN frame to the local controller. At step 794, the method comprises decoupling the local controller from the CAN bus. At step 795, the method involves invalidating the CAN message on the CAN bus. In some examples, step 795 can involve setting a plurality of bits, after a cyclic redundancy check, CRC, bit of the CAN frame, to a dominant value.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A security module for a controller area network, CAN, node, the security module comprising:
 a receive data, RXD, input interface for receiving data from a CAN bus;
 a transmit data, TXD, output interface for transmitting data to the CAN bus; and
 a RXD output interface for providing data to a local controller of the CAN node;
 wherein the security module is configured to:
  receive a CAN frame from the CAN bus via the RXD input interface, wherein the CAN frame includes a CAN message;
  compare an identifier of the received CAN frame with at least one identifier stored on the CAN node that is uniquely assigned to the CAN node; and
  upon detection of a match between the identifier of the received CAN frame and the at least one identifier stored on the CAN node that is uniquely assigned to the CAN node with the local controller:
   pass the received CAN message to the local controller via the RXD output interface;
   decouple the local controller from the CAN bus; and
   invalidate the CAN message on the CAN bus via the TXD output interface at the same time as or following decoupling of the local controller from the CAN bus.

2. The security module of claim 1 further comprising a TXD input interface for receiving data from the local controller;

wherein the security module is further configured to decouple the local controller from the CAN bus by coupling the TXD input interface to the RXD output interface.

3. The security module of claim 1 wherein the security module is configured to invalidate the CAN message on the CAN bus by setting a plurality of bits, after a cyclic redundancy check, CRC, bit of the CAN frame, to a dominant value.

4. The security module of claim 1, wherein the security module is configured to decouple the local controller from the CAN bus and invalidate the CAN message on the CAN bus for bits of the CAN frame immediately following a cyclic redundancy check, CRC, bit of the CAN frame.

5. The security module of claim 1, wherein the security module is configured to decouple the local controller from the CAN bus until it receives a recessive bit from the CAN bus via the RXD input interface.

6. The security module of claim 1, wherein the security module is further configured to recouple the local controller to the CAN bus following receipt of a recessive bit from the CAN bus.

7. The security module of claim 1, wherein the security module is configured to pass a portion of the CAN frame to the local controller wherein the portion comprises bits of the CAN frame prior to and optionally including one or more acknowledge bits of the CAN frame.

8. The security module of claim 1, wherein the security module is configured to provide the received CAN frame unmodified to the local controller via the RXD output interface.

9. The security module of claim 1 for use in a Classical CAN, CAN FD or CAN XL network.

10. A CAN node comprising:
    a CAN transceiver;
    a local controller; and
    a security module comprising:
        a receive data, RXD, input interface for receiving data from a CAN bus;
        a transmit data, TXD, output interface for transmitting data to the CAN bus; and
        a RXD output interface for providing data to a local controller;
        a TXD input interface for receiving data from the local controller wherein the security module is configured to:
        receive a CAN frame from the CAN bus via the RXD input interface, wherein the CAN frame includes a CAN message;
        compare an identifier of the received CAN frame with at least one identifier stored on the CAN node that is uniquely assigned to the CAN node; and
        upon detection of a match between the identifier of the received CAN frame and the at least one identifier stored on the CAN node that is uniquely assigned to the CAN node:
        pass the received CAN message to the local controller via the RXD output interface;
        decouple the local controller from the CAN bus by coupling the TXD input interface to the RXD output interface; and
        invalidate the CAN message on the CAN bus via the TXD output interface at the same time as or following decoupling of the local controller from the CAN bus, wherein:
        the RXD input interface and the TXD output interface of the security module are configured to communicate with the CAN bus via the CAN transceiver, and the security module is configured to communicate with the local controller via the RXD output interface and the TXD input interface.

11. The CAN node of claim 10, wherein the security module is configured to invalidate the CAN message on the CAN bus by setting a plurality of bits, after a cyclic redundancy check, CRC, bit of the CAN frame, to a dominant value.

12. The CAN node of claim 10, wherein the security module is further configured to recouple the local controller to the CAN bus following receipt of a recessive bit from the CAN bus.

13. The CAN node of claim 10 wherein the local controller is configured to determine that the received CAN frame is a malicious frame.

14. The CAN node of claim 13 wherein the local controller is configured to determine that the received CAN frame is a malicious frame by comparing the identifier of the received CAN frame with the at least one identifier associated with a local controller.

15. The CAN node of claim 10 wherein the local controller is configured to output a dominant acknowledge bit followed by recessive bits upon receipt of the received CAN frame.

16. The CAN node of claim 13 wherein upon determination that the received frame is a malicious frame, the local controller is configured to do one or more of:
    log the CAN frame as a malicious frame;
    alert or display an error to a network operator that the CAN node and/or the CAN network are under attack;
    put the CAN node into an emergency mode or shut down the CAN node;
    put one or more other CAN nodes on the CAN bus and/or the CAN network into an emergency mode; and
    send a message to other CAN nodes on the CAN bus indicating that the CAN network is under attack.

17. The CAN node of claim 10 for use in a Classical CAN, CAN FD or CAN XL network.

18. A method for invalidating a CAN message on a CAN bus, the method comprising:
    receiving a CAN frame from the CAN bus, wherein the CAN frame includes the CAN message;
    comparing an identifier of the received CAN frame with at least one identifier stored on the CAN node that is uniquely assigned to the CAN node;
    detecting a match between the identifier of the received CAN frame and the at least one identifier stored on the CAN node that is uniquely assigned to the CAN node;
    passing the received CAN message to the local controller;
    decoupling the local controller from the CAN bus; and
    invalidating the CAN message on the CAN bus at the same time as or following the decoupling of the local controller from the CAN bus.

19. The method of claim 18, wherein decoupling the local controller from the CAN bus comprises coupling data received from the local controller, at a transmit data, TXD, input interface, directly back to the local controller via a receive data, RXD, output interface.

20. The method of claim 18, wherein invalidating the CAN message on the CAN bus comprises setting a plurality of bits, after a cyclic redundancy check, CRC, bit of the CAN frame, to a dominant value.

* * * * *